US012804477B2

(12) United States Patent
(10) Patent No.: US 12,804,477 B2
(45) Date of Patent: Nov. 17, 2026

Salih et al.

(54) USER EQUIPMENT, SOURCE BASE STATION, TARGET BASE STATION, AND HANDOVER METHODS FOR UE MBS MOBILITY WITH SERVICE CONTINUITY

(71) Applicant: Huizhou TCL Cloud Internet Corporation Technology Co., Ltd., Huizhou (CN)

(72) Inventors: Ahmed Mohammed Mikaeil Salih, Huizhou (CN); Jia Sheng, Huizhou (CN)

(73) Assignee: Huizhou TCL Cloud Internet Corporation Technology Co., Ltd., Huizhou (CN)

( * ) Notice: Subject to any disclaimer, the term of this patent is extended or adjusted under 35 U.S.C. 154(b) by 0 days.

(21) Appl. No.: 18/595,457

(22) Filed: Mar. 5, 2024

(65) Prior Publication Data

US 2024/0214875 A1 Jun. 27, 2024

Related U.S. Application Data

(63) Continuation of application No. PCT/CN2021/123143, filed on Oct. 11, 2021.

(51) Int. Cl.
*H04W 36/00* (2009.01)
*H04W 36/08* (2009.01)

(52) U.S. Cl.
CPC ....... *H04W 36/0007* (2018.08); *H04W 36/08* (2013.01)

(58) Field of Classification Search
None
See application file for complete search history.

(56) References Cited

U.S. PATENT DOCUMENTS 11,943,789 B2 * 3/2024 Jactat ...................... H04W 4/06
2008/0132240 A1 * 6/2008 Baek .................. H04W 36/026 455/442
(Continued)

FOREIGN PATENT DOCUMENTS

CN 112954616 A 6/2021
EP 2200367 A1 * 6/2010 ........... H04W 92/20
(Continued)

OTHER PUBLICATIONS

Multicast Service Method for Fast Handoff in Mobile IP Network (KR_20050075645_A_I-translation) (Year: 2005).*
(Continued)

*Primary Examiner* — Pao Sinkantarakorn
*Assistant Examiner* — D Little
(74) *Attorney, Agent, or Firm* — PV IP PC; Wei Te Chung

(57) ABSTRACT

A user equipment (UE), a source base station, a target base station, and handover methods for UE MBS mobility with service continuity are provided. A handover method for UE MBS mobility with service continuity performed by the UE includes reporting, to a source base station, a handover control information and/or a measurement report when UE receiving an MBS data via MBS radio bearers (MRBs) from the source base station, receiving from the source base station, a handover command message containing an MBS DRB configuration of the source base station and/or a target base station, continuing receiving the MBS data from the source base station via the MRBs and/or unicast data radio bearers (DRBs), and releasing an MRB configuration and continuing receiving the MBS data from the target base station via the DRBs. This can support a UE MBS mobility with service continuity while receiving a multicast/broadcast service.

20 Claims, 6 Drawing Sheets

(56) References Cited

U.S. PATENT DOCUMENTS

| | | | | |
|---|---|---|---|---|
| 2014/0029580 | A1* | 1/2014 | Jung | H04W 36/0066 370/331 |
| 2015/0373638 | A1 | 12/2015 | Zhang | |
| 2021/0258918 | A1 | 8/2021 | Sung-Pyo | |
| 2023/0156436 | A1* | 5/2023 | Li | H04W 4/08 370/312 |
| 2023/0199569 | A1* | 6/2023 | Cao | H04W 36/0061 370/331 |
| 2024/0179580 | A1* | 5/2024 | Fujishiro | H04W 36/0007 |

FOREIGN PATENT DOCUMENTS

| | | | | | |
|---|---|---|---|---|---|
| KR | 20050075645 | | * | 7/2005 | |
| KR | 20050075645 | A | * | 7/2005 | H04W 36/12 |
| WO | 2021168257 | A1 | | 8/2021 | |
| WO | WO-2021233279 | A1 | * | 11/2021 | H04W 4/06 |

OTHER PUBLICATIONS

Huawei et al, "Mobility between MBS supporting and non-supporting nodes", Aug. 2021, 3GPP, R3-213988. (Year: 2021).*
Suh, "Multicast Service Method for Fast Handoff in Mobile IP Network", Jul. 2005. English translation. (Year: 2005).*
EP2200367A1-NPL (Year: 2010).*
R3-213988-NPL (Year: 2021).*
WO_2021233279_A1_I-NPL (Year: 2021).*
International Search Report in International application No. PCT/CN2021/123143, mailed on May 26, 2022.
Written Opinion of the International Search Authority in International application No. PCT/CN2021/123143,mailed on May 26, 2022.
Qualcomm Inc. "NR Multicast Broadcast mobility enhancements with service continuity" 3GPP TSG-RAN WG2 Meeting #115e, R2-2107548, Aug. 27, 2021(Aug. 27, 2021), sections 1-2.
Qualcomm Inc. "NR Multicast Broadcast mobility enhancements with service continuity" 3GPP TSG-RAN WG2 Meeting #114e, R2-2105019, May 28, 2021(May 28, 2021), sections 1-2.
Lenovo et al. "Mobility between MBS Supporting and non-Supporting nodes" 3GPP TSG-RAN WG3 Meeting #112e, R3-212187, May 27, 2021(May 27, 2021), sections 1-3.
European Search Report in European application No. 21960158.0, mailed on May 19, 2025.
NPL1: Huawei et al: "(TP to TS 38.300 BL CR) Mobility between MBS , supporting and non-supporting nodes", 3GPP Draft: R3-213988. [Aug. 6, 2021].

* cited by examiner

USER EQUIPMENT, SOURCE BASE STATION, TARGET BASE STATION, AND HANDOVER METHODS FOR UE MBS MOBILITY WITH SERVICE CONTINUITY

BACKGROUND OF DISCLOSURE

1. Field of the Disclosure

The present disclosure relates to the field of wireless communication systems, and more particularly, to a user equipment (UE), a source base station, a target base station, and handover methods for UE MBS mobility with service continuity, for example, particularly to a service continuity of a multicast-broadcast service (MBS) during a mobility from a radio access network (RAN) node supporting a MBS service to a RAN node not-supporting the MBS service and vice versa.

2. Description of the Related Art

In a 3rd generation partnership project (3GPP) cellular network, broadcast and multicast services may be transported via a transport service called multimedia broadcast/multicast service (MBMS). A broadcast multicast service center (BM-SC) server is responsible to disseminate a media content to a group of subscribers. When a UE moves out of a network coverage, the UE may be unable to use the MBMS because uplink and downlink connections to the BM-SC server are no longer available. MBMS is a point-to-multipoint (PTM) interface specification designed to provide efficient delivery of broadcast and multicast services within 3GPP cellular networks. Examples of MBMS interface specifications include those described in universal mobile telecommunication system (UMTS) and long term evolution (LTE) communication specifications. For broadcast transmission across multiple cells, the specifications define transmission over single-frequency network configurations. Intended applications include mobile TV, news, radio broadcasting, file delivery, emergency alerts, and others. When services are broadcasted by MBMS, all cells inside a multimedia broadcast/multicast service single frequency network (MBSFN) area transmit the same MBMS service.

Users access these services and obtain the MBMS content through wireless communication devices such as cellular phones, tablets, laptops, and other devices with wireless transceivers that communicate with the base station within the communication system. The base station provides wireless service to the wireless communication devices, sometimes referred to as mobile devices or UEs, within cells. A user can access at least some multimedia services through a UE using either a point-to-point (PTP) connection or a PTM transmission. In 3GPP systems, PTP services can be provided using unicast techniques and PTM transmissions can be provided using MBMS communication, transmitted over an MBSFN or single cell point to multipoint (SC-PTM) communication. In systems operating in accordance with a revision of 3GPP long term evolution (LTE) communication specification, MBMS is provided using eMBMS. Accordingly, an MBMS service can be provided using either unicast service, MBSFN, or SC-PTM in an LTE system.

In radio access network (RAN) meeting #88-e held during Jun. 29, 2020 to Jul. 3, 2020, a new working item was approved to target a RAN support of multicast/broadcast services (MBS) in 5G. Aims of this working item is to provide the support in RAN to enable general MBS services over 5GS to support different MBS services such as public safety and mission critical, V2X applications, transparent IPv4/IPv6 multicast delivery, IPTV, software delivery over wireless, group communications, and IoT applications. One of key objectives of this RAN working item is to study and specify the support for basic mobility with service continuity for 5G new radio (NR) multicast/broadcast services (MBS).

According to RAN2, RAN3, and SA2 agreements which have been made during the latest discussion on release 17 MBS, it has been agreed that release 17 MBS will go to support a UE mobility between a source gNB supporting MBS and a target gNB not supporting MBS by switching of the multicast/broadcast and unicast radio bearers. Although, during these RAN2 and RAN3 meetings, some companies have provided some views on the issue of mobility from a supporting to a non-MBS supporting node including the issue of MRB and DRB switching. However, there are still no clear views on 1) how and/or at which stage of the handover of the switching of a traffic over radio bearers shall be performed, 2) what is the best type of handover that should be performed to achieve the goal of switching, 3) what type of signaling will be needed within the respective handover, and 4) how to guarantee a UE service continuity during the handover. Therefore, this invention proposes handover methods performed by the UE, a source base station, a target base station which can support a UE mobility to non-MBS supporting node while guaranteeing UE service continuity.

SUMMARY

An object of the present disclosure is to propose a UE, a source base station, a target base station, and handover methods for UE MBS mobility with service continuity, which can support a UE MBS mobility with service continuity while receiving a multicast/broadcast service.

In a first aspect of the present disclosure, a handover method for UE MBS mobility with service continuity performed by a UE includes reporting by the UE while the UE is receiving from a source base station, a multicast/broadcast service (MBS) data via MBS radio bearers (MRBs) a handover control information and/or a measurement report to a source base station, receiving from the source base station, a handover command message containing an MBS DRB configuration of a target base station, continuing to receive the MBS data from the source base station via the MRBs and/or unicast data radio bearers (DRBs), releasing to the source base station an MRB configuration and continuing to receive the MBS data from the source base station via the DRBs until sending a handover complete message to both the source base station and the target base station, and then starting to receive the MBS data from the target base station via the DRBs.

In a second aspect of the present disclosure, a handover method for UE MBS mobility with service continuity performed by a source base station includes receiving a handover control information and/or a measurement report from a UE while the source base station transmitting an MBS data via MRBs to the UE, transmitting, to a target base station, a handover request comprising an MBS information (i.e., an information about the MBS data that the UE is receiving from the source base station) and receiving, from the target base station, a handover acknowledgement comprising an indication about whether the MBS data which UE is receiving from the source base station is supported at/by the target base station, transmitting, to the UE, a handover command containing an MBS DRB configuration of the source base station and/or the target base station, switching the MBS data from MRBs into DRBs configured by the source base station or by the target base station, and transmitting the MBS data to the UE via DRBs.

In a third aspect of the present disclosure, a handover method for UE MBS mobility with service continuity performed by a target base station includes: receiving a handover request comprising an information about an MBS data of interest of the UE from a source base station, configuring DRBs containing the MBS data of interest of the UE and transmitting to the source base station, a handover acknowledgement comprising at least an indication bit (e.g., a 0/1 bit to indicate whether the MBS service that the UE is receiving from the source base station is supported by the target base station) and/or a configuration of the DRBs containing a UE service of interest, and transmitting the MBS data to the UE via the DRBs.

In a fourth aspect of the present disclosure, a user equipment (UE) comprises a memory, a transceiver, and a processor coupled to the memory and the transceiver. The processor is configured to perform the above method.

In a fifth aspect of the present disclosure, a source base station comprises a memory, a transceiver, and a processor coupled to the memory and the transceiver. The processor is configured to perform the above method.

In a sixth aspect of the present disclosure, a target base station comprises a memory, a transceiver, and a processor coupled to the memory and the transceiver. The processor is configured to perform the above method.

In a seventh aspect of the present disclosure, a non-transitory machine-readable storage medium has stored thereon instructions that, when executed by a computer, cause the computer to perform the above method.

In an eighth aspect of the present disclosure, a chip includes a processor, configured to call and run a computer program stored in a memory, to cause a device in which the chip is installed to execute the above method.

In a ninth aspect of the present disclosure, a computer readable storage medium, in which a computer program is stored, causes a computer to execute the above method.

In a tenth aspect of the present disclosure, a computer program product includes a computer program, and the computer program causes a computer to execute the above method.

In an eleventh aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
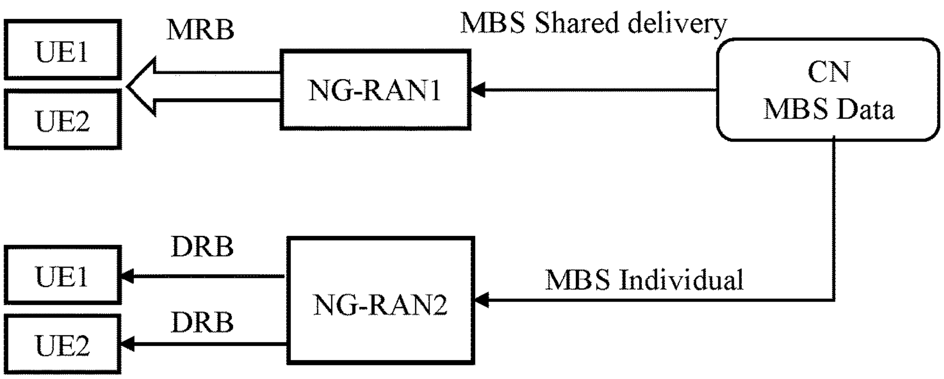
FIG. 1 is a schematic diagram illustrating an example of MBS data transmission and delivery methods according to an embodiment of the present disclosure.

FIG. 1 is a schematic diagram illustrating an example of MBS data transmission and delivery methods according to an embodiment of the present disclosure. Multicast/broadcast services (MBS) is expected to cover diversity of 5G applications and services ranging from public safety, mission critical, V2X, transparent IPv4/IPv6 multicast delivery, IPTV, software delivery over wireless to group communications and IoT applications. As a part of 5G NR R17 standardization, a new working item is approved WID [RP-201308] targeting the RAN support of (MBS). One of the main objectives of working item is to study and specify a specify support for basic mobility with service continuity for MBS capable UE [RAN2, RAN3]. Regarding to this specific objective, two types of mobility approaches has been identified and discussed in 3GPP working groups (i.e., RAN2, RAN3 and SA2), the first one is the mobility from an MBS supporting RAN node to another MBS supporting RAN node; and the second one is the mobility from an MBS supporting RAN node to a non-supporting RAN node. In the regard of the mobility form an MBS supporting RAN to a non-supporting RAN, 3GPP SA2 WG has agreed to support this type of UE mobility in release 17 MBS. In order to guarantee such a UE mobility, SA2 has specifics on two delivery methods for MBS user data from the core network (CN) as follows as illustrated in FIG. 1. 1. 5GC individual MBS traffic delivery: 5G CN receives a single copy of MBS data packets and delivers separate copies of those MBS data packets to individual UEs via per-UE PDU sessions, hence for each such UE one PDU session is required to be associated with a multicast session. 2. 5GC shared MBS traffic delivery: 5G CN receives a single copy of MBS data packets and delivers a single copy of those MBS data packets to a RAN node. Additionally, SA2 has also specified the support of switching between 5GC Shared MBS traffic delivery method and 5GC Individual MBS traffic delivery method. On the other hand, 3GPP RAN2 working group has specified a new radio bearer, apart from the data radio bearer (DRB) used for unicast delivery, to be used for MBS multicast/broadcast delivery; namely, MBS radio bearer (MRB) as illustrated in FIG. 1. In addition, RAN2 has also agreed that the mobility between a source gNB supporting MBS and target gNB not supporting MBS can be achieved by switching the traffic from delivery via MRB to delivery via DRB either before or during the handover. However, there are still no clear views on 1) how and/or at which stage of the handover of the switching of a traffic over radio bearers shall be performed, 2) what is the best type of handover that should be performed to achieve the goal of switching, 3) what type of singling will be needed within the respective handover, and 4) how to guarantee a UE service continuity during the handover. The embodiments of the present disclosure provide a handover method performed by a UE, a source base station and a target base station to address the above mentioned issues.

Figure 2:
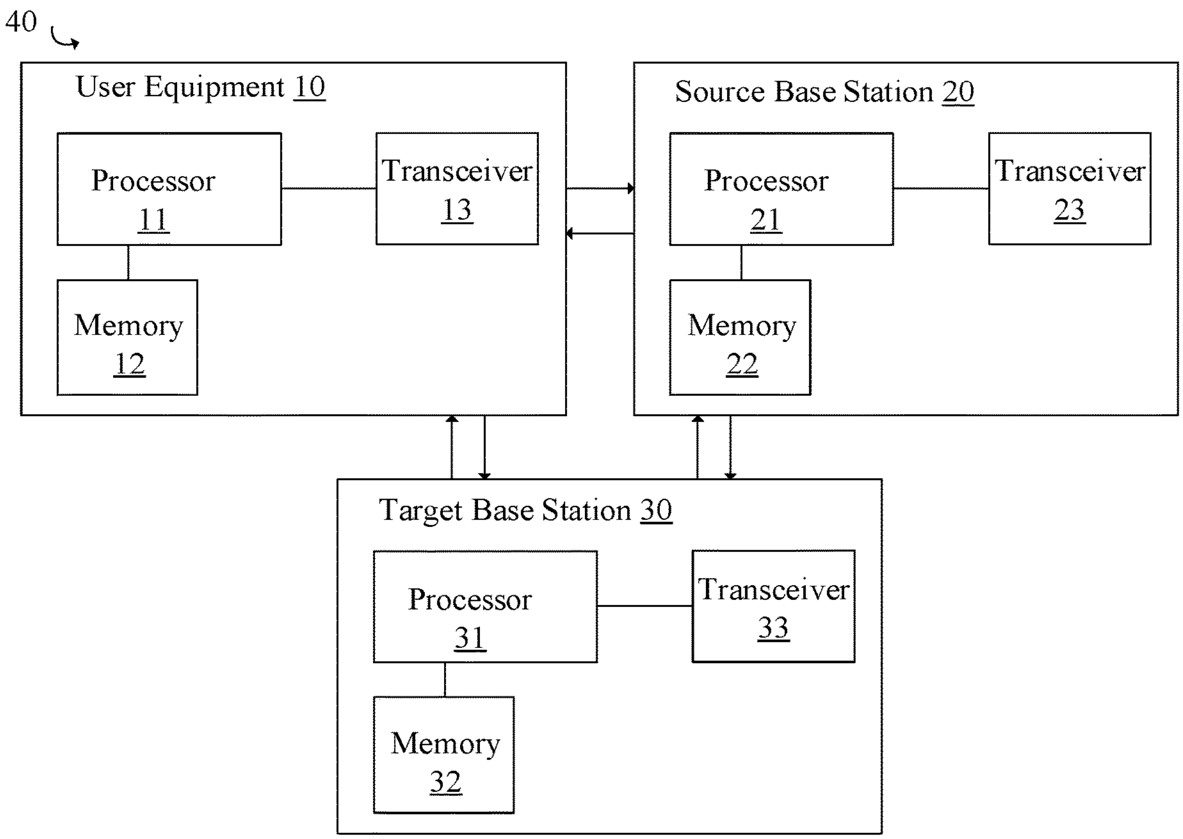
FIG. 2 is a block diagram of one or more user equipments (UEs), a source base station (e.g., source gNB), a target base station (e.g., target gNB) in a communication network system according to an embodiment of the present disclosure.

FIG. 2 illustrates that, in some embodiments, one or more user equipments (UEs) 10, a source base station (e.g., source gNB) 20, and a target base station (e.g., target gNB) 30 for communication in a communication network system 40 according to an embodiment of the present disclosure are provided. The communication network system 40 includes the one or more UEs 10, the source base station 20, and the target base station. The one or more UEs 10 may include a memory 12, a transceiver 13, and a processor 11 coupled to the memory 12 and the transceiver 13. The source base station 20 may include a memory 22, a transceiver 23, and a processor 21 coupled to the memory 22 and the transceiver 23. The target base station 30 may include a memory 32, a transceiver 33, and a processor 31 coupled to the memory 32 and the transceiver 33. The processor 11, 21, or 31 may be configured to implement proposed functions, procedures and/or methods described in this description. Layers of radio interface protocol may be implemented in the processor 11, 21, or 31. The memory 12, 22, or 32 is operatively coupled with the processor 11, 21, or 31 and stores a variety of information to operate the processor 11, 21, or 31. The transceiver 13, 23, or 33 is operatively coupled with the processor 11, 21, or 31, and the transceiver 13, 23, or 33 transmits and/or receives a radio signal.

The processor 11, 21, or 31 may include application-specific integrated circuit (ASIC), other chipset, logic circuit and/or data processing device. The memory 12, 22, or 32 may include read-only memory (ROM), random access memory (RAM), flash memory, memory card, storage medium and/or other storage device. The transceiver 13, 23, or 33 may include baseband circuitry to process radio frequency signals. When the embodiments are implemented in software, the techniques described herein can be implemented with modules (e.g., procedures, functions, and so on) that perform the functions described herein. The modules can be stored in the memory 12, 22, or 32 and executed by the processor 11, 21, or 31. The memory 12, 22, or 32 can be implemented within the processor 11, 21, or 31 or external to the processor 11, 21, or 31 in which case those can be communicatively coupled to the processor 11, 21, or 31 via various means as is known in the art.

In some embodiments, the transceiver 13 is configured to report, to the source base station 20, a handover control information and/or a measurement report when the transceiver 13 receives a multicast/broadcast service (MBS) data via MBS radio bearers (MRBs) from the source base station 20, the transceiver 13 is configured to receive from the source base station 10, a handover command message containing an MBS data radio bearer (DRB) configuration of the source base station 20 and/or a target base station 30, the transceiver 13 is configured to continue receiving the MBS data from the source base station 20 via the MRBs and/or unicast data radio bearers (DRBs), and the processor 11 is configured to releasing an MRB configuration and the transceiver 13 is configured to continue receiving the MBS data from the target base station 30 via the DRBs. This can support a UE MBS mobility with service continuity while receiving a multicast/broadcast service.

In some embodiments, the transceiver 23 is configured to receive, from the UE 10, a handover control information and/or a measurement report when the transceiver 23 transmits an MBS data via MRBs to the UE 10, the transceiver 23 is configured to transmit a handover request comprising an MBS information to a target base station 30, the transceiver 23 is configured to receive, from the target base station 30, a handover acknowledgement comprising an indication about whether the MBS information is supported by the target base station 30, the transceiver 23 is configured to transmit, to the UE 10, a handover command containing an MBS DRB configuration of the source base station 20 and/or the target base station 30, the processor 21 is configured to switch the MBS data from the MRBs into DRBs configured by the source base station 20 or by the target base station 30, and the transceiver 23 is configured to transmit the MBS data to the UE via the DRBs. This can support a UE MBS mobility with service continuity while receiving a multicast/broadcast service.

In some embodiments, the transceiver 33 is configured to receive a handover request comprising an MBS information from the source base station 20, the processor 31 is configured to configure DRBs containing an MBS data of interest of the UE, the transceiver 33 is configured to transmit, to the source base station, a handover acknowledgement comprising an indication about whether the MBS information is supported by the target base station, and the transceiver 33 is configured to transmit the MBS data to the UE via the DRBs. This can support a UE MBS mobility with service continuity while receiving a multicast/broadcast service.

Figure 3:
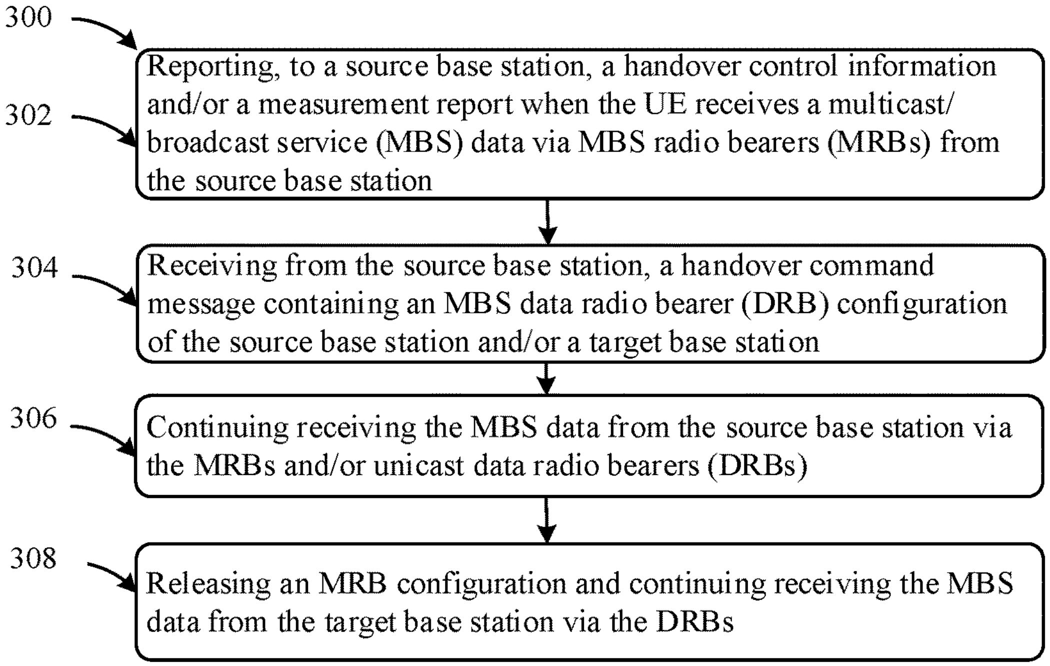
FIG. 3 is a flowchart illustrating a handover method for UE MBS mobility with service continuity performed by a UE according to an embodiment of the present disclosure.

FIG. 3 illustrates a handover method 300 for UE multicast/broadcast service (MBS) mobility with service continuity performed by a UE includes according to an embodiment of the present disclosure. In some embodiments, the method 300 includes: a block 302, reporting, to a source base station, a handover control information and/or a measurement report when the UE receives an MBS data via MBS radio bearers (MRBs) from the source base station, a block 304, receiving from the source base station, a handover command message containing an MBS data radio bearer (DRB) configuration of the source base station and/or a target base station, a block 306, continuing receiving the MBS data from the source base station via the MRBs and/or unicast data radio bearers (DRBs), and a block 308, releasing an MRB configuration and continuing receiving the MBS data from the target base station via the DRBs. This can support a UE MBS mobility with service continuity while receiving a multicast/broadcast service.

In some embodiments, the handover method for UE MBS mobility with service continuity further comprises transmitting, by the UE, a handover complete radio resource control (RRC) configuration message to the source base station and the target base station. In some embodiments, the UE receives the MBS data via the MRBs from the source base station during a UE mobility from the source base station to the target base station. In some embodiments, the MBS data comprises a first MBS data from a user plane function (UPF) and an MBS control data from a session management function (SMF) and/or an access management function (AMF) of a core network (CN) via MRBs or DRBs.

Figure 4:
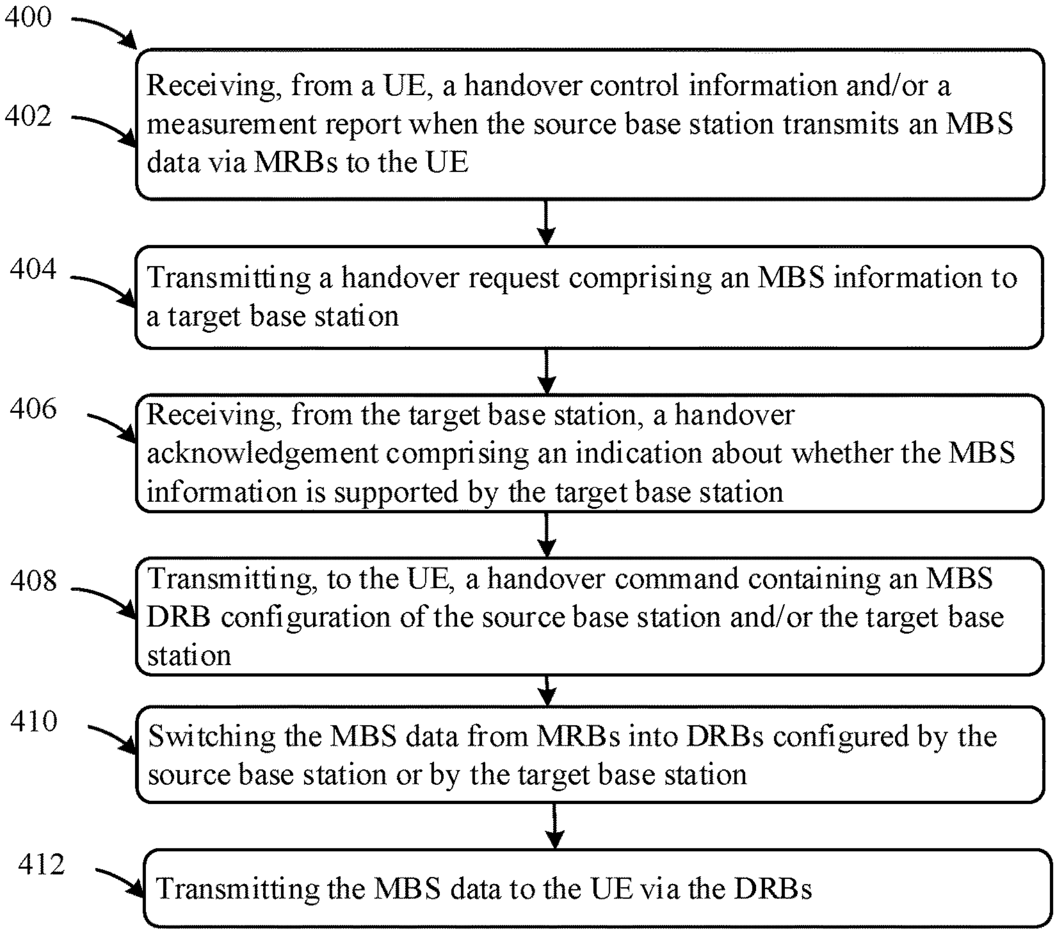
FIG. 4 is a flowchart illustrating a handover method for UE MBS mobility with service continuity performed by a source base station according to an embodiment of the present disclosure.

FIG. 4 illustrates a handover method 400 for UE MBS mobility with service continuity performed by a source base station includes according to an embodiment of the present disclosure. In some embodiments, the method 400 includes: a block 402, receiving, from a UE, a handover control information and/or a measurement report when the source base station transmits an MBS data via MRBs to the UE, a block 404, transmitting a handover request comprising an MBS information to a target base station, a block 406, receiving, from the target base station, a handover acknowledgement comprising an indication about whether the MBS information is supported by the target base station, a block 408, transmitting, to the UE, a handover command containing an MBS DRB configuration of the source base station and/or the target base station, a block 410, switching the MBS data from MRBs into DRBs configured by the source base station or by the target base station, and a block 412, transmitting the MBS data to the UE via the DRBs. This can support a UE MBS mobility with service continuity while receiving a multicast/broadcast service.

In some embodiments, the switching the MBS information, by the source base station, from MRBs to DRBs is according to the indication. In some embodiments, the handover method for UE MBS mobility with service continuity further comprises releasing the MRBs, by the source base station, if no other UE receives the MBS data via the MRBs. In some embodiments, the handover method for UE MBS mobility with service continuity further comprises transmitting, by the source base station, an indication acting as a switch delivery stop to a CN to indicate that the MBRs are switched or released. In some embodiments, the source base station transmits the MBS data via the MRBs to the UE during a UE mobility from the source base station to the target base station. In some embodiments, the MBS data comprises an MBS data from a user plane function (UPF) and an MBS control data from a session management function (SMF) and/or an access management function (AMF) of a core network (CN) via MRBs or DRBs. In some embodiments, the MBS information comprises a temporary mobile group identity (TMGI), a service identifier (ID), an MBS bearer ID, and/or a quality of service (QOS) flow to an MRB mapping.

Figure 5:
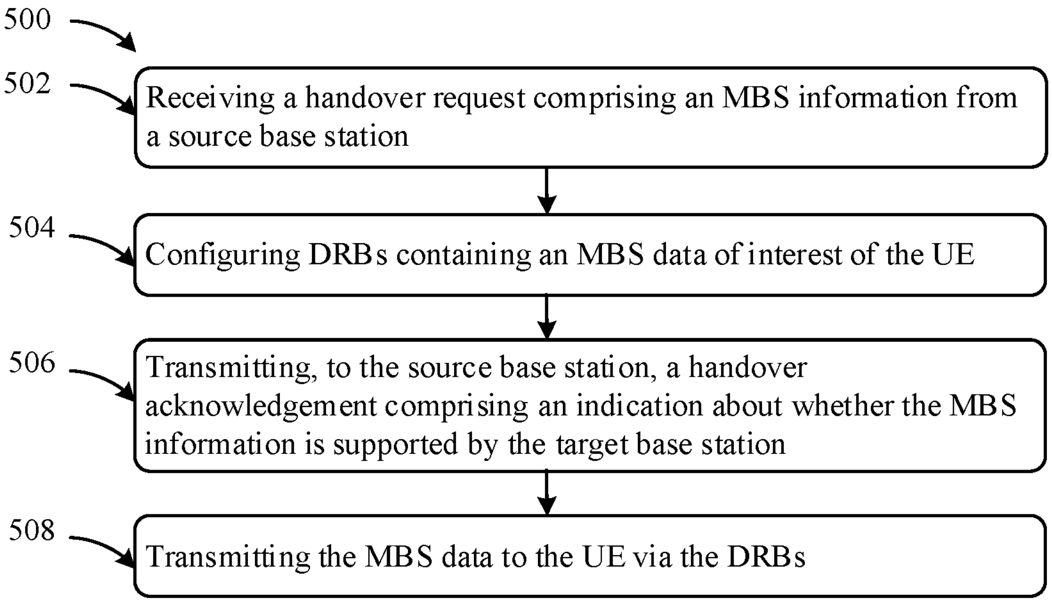
FIG. 5 is a flowchart illustrating a handover method for UE MBS mobility with service continuity performed by a target base station according to an embodiment of the present disclosure.

FIG. 5 illustrates a handover method 500 for UE MBS mobility with service continuity performed by a target base station includes according to an embodiment of the present disclosure. In some embodiments, the method 500 includes: a block 502, receiving a handover request comprising an MBS information from a source base station, a block 504, configuring DRBs containing an MBS data of interest of the UE, a block 506, transmitting, to the source base station, a handover acknowledgement comprising an indication about whether the MBS information is supported by the target base station, and a block 508, transmitting the MBS data to the UE via the DRBs. This can support a UE MBS mobility with service continuity while receiving a multicast/broadcast service.

In some embodiments, the handover method for UE MBS mobility with service continuity further comprises transmitting, by the target base station, an MBS delivery switch request for the MBS information to a CN. In some embodiments, the handover method for UE MBS mobility with service continuity further comprises keeping receiving, by the target base station, a copy of an MBS data received over an individual delivery tunnel and buffering the MBS data until the target base station receives a switch delivery acknowledgment from the CN. In some embodiments, the handover method for UE MBS mobility with service continuity further comprises starting providing, by the target base station, the MBS data to a UE via DRBs upon a reception of a handover complete RRC configuration message from the UE or the switch delivery acknowledgment from the CN. In some embodiments, the MBS data comprises a first MBS data from a user plane function (UPF) and an MBS control data from a session management function (SMF) and/or an access management function (AMF) of a core network (CN) via MRBs or DRBs. In some embodiments, the MBS information comprises a temporary mobile group identity (TMGI), a service identifier (ID), an MBS bearer ID, and/or a quality of service (QOS) flow to an MRB mapping.

In some embodiments of this disclosure propose a new complete handover method to address the above problems. The major advantages of the new method include: 1) the new method allows UE to continue receiving MBS services during the mobility from a RAN node supporting MBS service to a RAN node not supporting MBS service. 2). the new method preconfigures the UE with the required configuration for receiving MBS before mobility to the target RAN which could minimize UE service interruption during the handover process.

Figure 6:
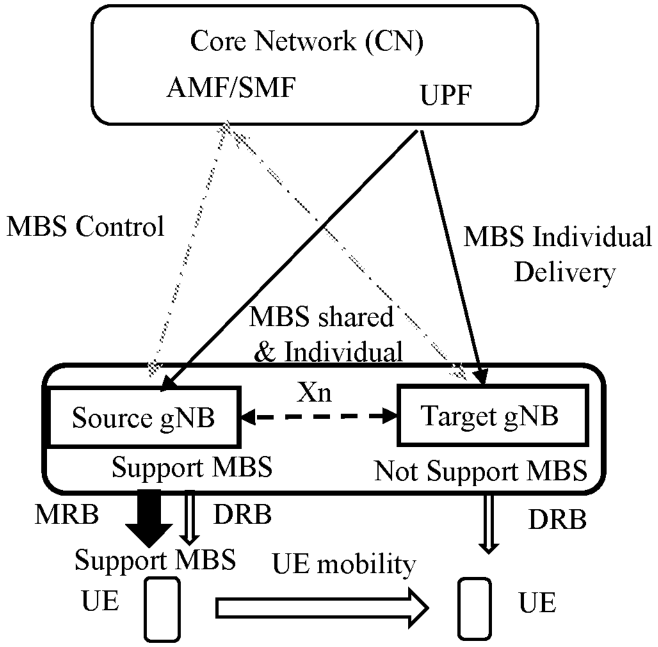
FIG. 6 is a schematic diagram illustrating an example of UEs mobility from an NG-RAN node supporting MBS to non-supporting node and vice versa according to an embodiment of the present disclosure.

FIG. 6 is a schematic diagram illustrating an example of UEs mobility from an NG-RAN node supporting MBS to non-supporting node and vice versa according to an embodiment of the present disclosure. The method considers a scenario where an MBS capable UE receives an MBS service in a source RAN node (i.e., source gNB), i.e., MBS data form the user plane function (UPF) and MBS control data from session management function (SMF) and/or access management function (AMF) of a 5G core network (CN) via MBS radio bearers (MRBs) or unicast data radio bearers (DRBs) and move to a target NG-RAN node (i.e., target gNB) not-supporting the service provided MBS as given in FIG. 6.

Figure 7:
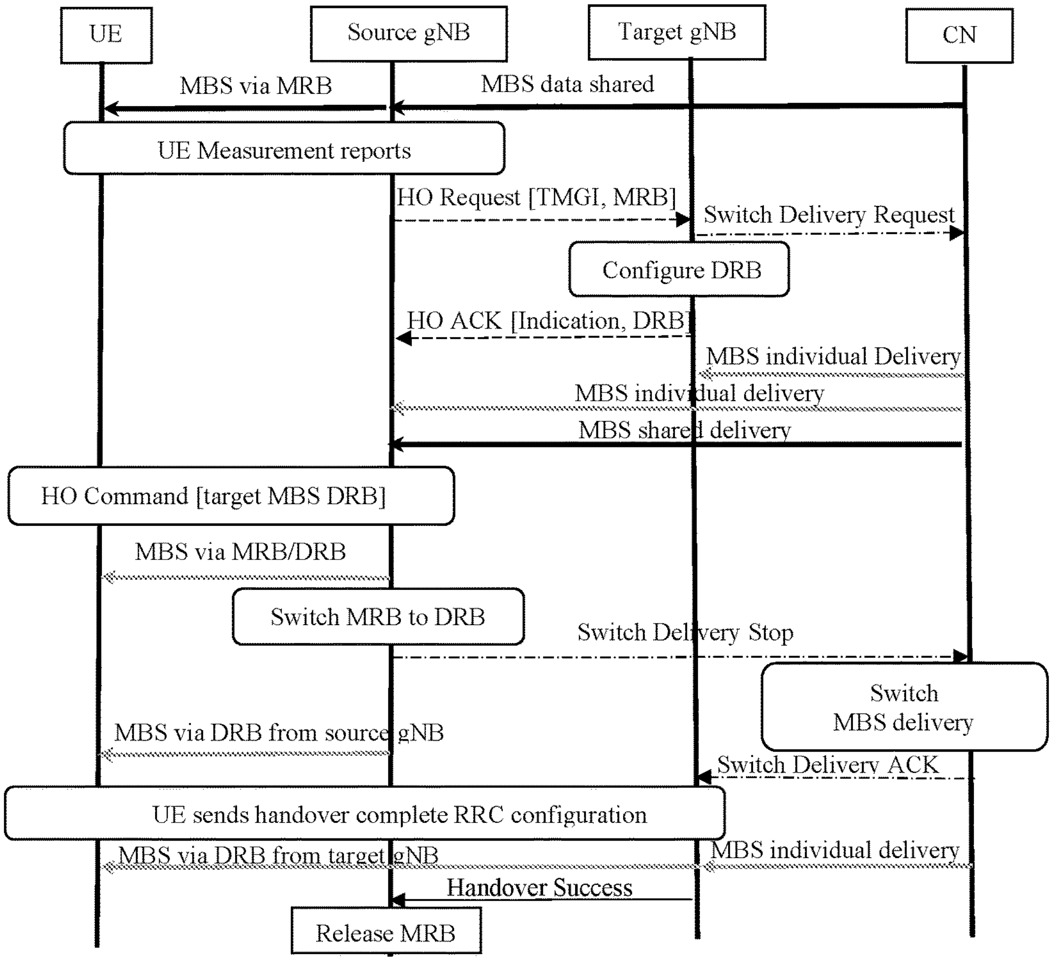
FIG. 7 is a schematic diagram illustrating an example of MBS handover procedure to a target gNB not supporting MBS target according to an embodiment of the present disclosure.

FIG. 7 is a schematic diagram illustrating an example of MBS handover procedure to a target gNB not supporting MBS target according to an embodiment of the present disclosure. FIG. 7 illustrates that, in some embodiments, a UE Reports a handover control information and/or measurement to a source gNB while receiving an MBS data via MRBs during mobility to a target gNB. The source gNB sends a handover request containing an MBS service information at the source gNB such as TMGI, service ID, MBS bearer IDs, and/or QoS flow to MRB mapping to the target gNB. Upon the reception of a handover (HO) request from the source gNB, the target gNB responses to the request by sending a handover acknowledgement (ACK) message containing an indication about whether the TMGI, service, or MRBs provided by the source gNB is available or supported by the target gNB or not as illustrated in Table 1.

TABLE 1

| The gNB indicated bit within the handover request acknowledgement message | |
|---|---|
| gNB indicated bit within the handover acknowledgement message | Bit indication meaning at the target gNB |
| 1 | The respective [TMGI and Service id, MBS MRB] is supported by the target gNB |
| 0 | The respective [TMGI and Service id, MBS MRB] is not supported by the target gMB |

FIG. 7 illustrates that, in some embodiments, if the TMGI or service or MRB is supported by target gNB, the target gNB will indicate a bit value e.g., 0 to the source gNB within the handover ACK message, and the source will apply a handover similar to legacy unicast NR for the respective MRB to the MRB of the target. If the TMGI or service or MRB is not supported by target gNB, the target gNB will indicate a bit value e.g., 1" to the source gNB at the same time, it will send an MBS switch delivery request to a CN. Upon the reception of the switch delivery request, the CN generates an individual delivery tunnel for the MBS associated PDU session on the top of the existing shared delivery tunnel used for MBS session. The CN sends a copy of the MBS data to the source gNB over both the individual delivery tunnel as well as the existing shared delivery tunnel MBS data to the source gNB; at the same time, the CN may also provide a copy of MBS data to via individual delivery tunnel to the target gNB. The target gNB keeps receiving the copy of MBS data received over the individual delivery tunnel and buffering the data until it receives a switch delivery acknowledgment from the CN. The source gNB configures an MBS DRB for the individual delivery tunnel with a TMGI, MBS PDU session ID and QoS to DRB mapping similar to the mapping of the QoS flows and MRB within the existing MBS session. It may also provide the MBS data to the UE via the new configured MBS DRB, and the UE may continue to receive MBS data from the source gNB via either MRB or DRB bearers or both of them.

FIG. 7 illustrates that, in some embodiments, the source gNB sends a handover command message to the UE including MBS configuration (e.g., MBS DRB configuration, QoS to DRB mapping configuration, etc.) as well as all other information required to access a cell in the target gNB (e.g., radio network temporary identifier C-RNTI, cell ID etc.,) so that the UE can access the target cell without reading its system information. Then, the source gNB may switch the MBS data (i.e., the MBS content e.g., TMGI/session ID) from MRB bearer into the new configured DRB and provide MBS data via DRB to UE. It may also release MRB bearers if no other UE receiving it and send an indication acting as a switch delivery stop to the CN to indicate that the MBR bearer is switched or released so that the CN can send a switch delivery acknowledgment to the target gNB and/or release the shared tunnel if the MRB is already released by the source NB. Upon the reception of the handover command message from the source, the UE may release MRB configuration and continue to receive MBS data from source gNB via DRB until it successfully access a cell in target gNB and sends handover complete RRC configuration message to both target and source gNBs, and then, it can start receiving MBS via DRB from the target gNB.

Based on the above handover method the service continuity can be easily guaranteed for the UE since the UE will be able to receive the MBS data during all of preparation, execution and completion phases of the handover procedures. Other major advantages of the above handover method include: 1. The new method may allow the UE to avoid data loss while receiving MBS services during moving from a RAN node supporting MBS service to a RAN node not supporting MBS service. 2. The new method may help reducing UE service interruption time since the method allow a copy of MBS data to be available in advance at the target gNB before UE moving to it. 3. The new method preconfigures UE with the required configuration for receiving MBS before mobility to target RAN which could minimize UE service interruption during the handover process.

Figure 8:
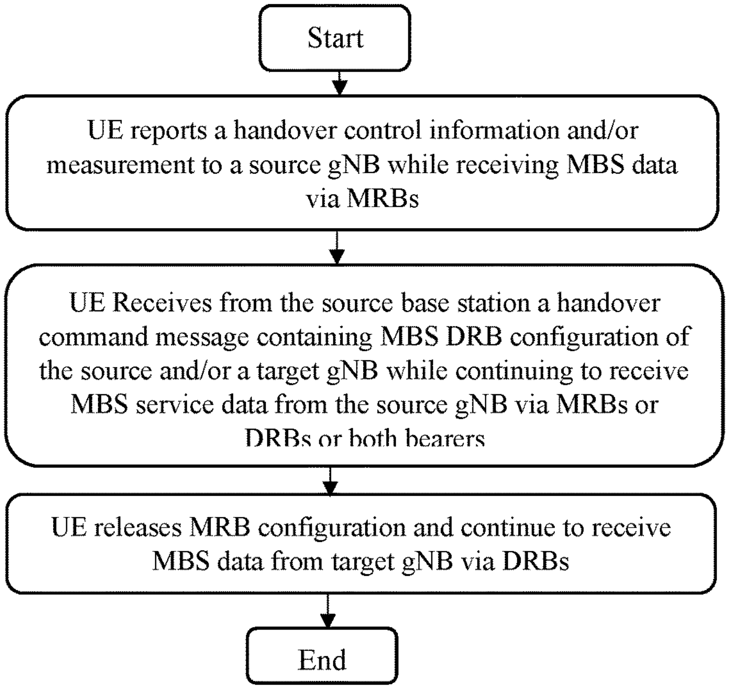
FIG. 8 is a schematic diagram illustrating an example of UEs side handover procedures according to an embodiment of the present disclosure.

FIG. 8 is a schematic diagram illustrating an example of UEs side handover procedures according to an embodiment of the present disclosure. FIG. 8 illustrates that, in some embodiments, a UE reports a handover control information and/or measurement to a source gNB while receiving MBS data via MRBs, the UE continues receiving MBS data from the source gNB via MRBs or DRBs or both bearers, and the UE releases MRB configuration and continue to receive MBS data from target gNB via DRBs.

Figure 9:
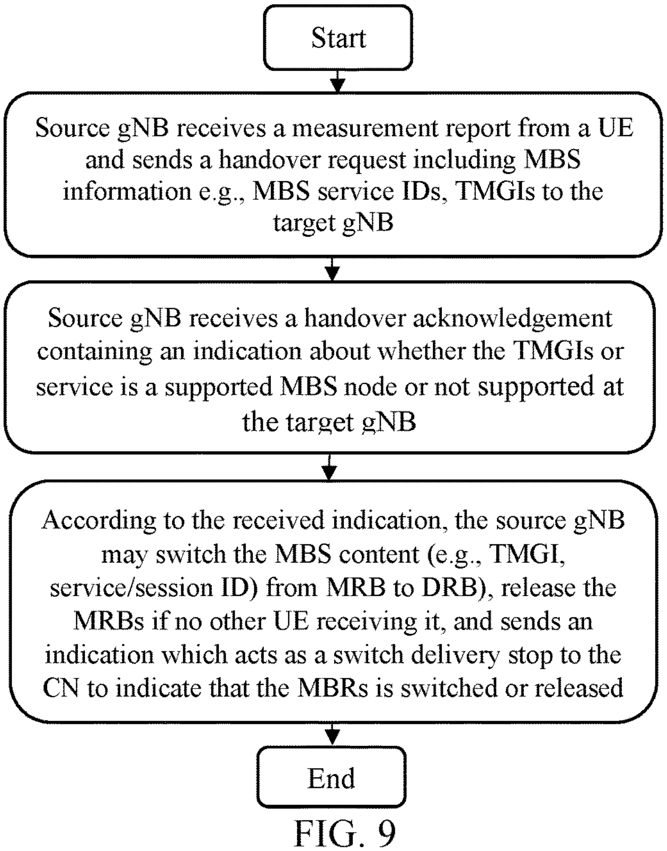
FIG. 9 is a schematic diagram illustrating an example of source gNB side handover procedures according to an embodiment of the present disclosure.

FIG. 9 is a schematic diagram illustrating an example of source gNB side handover procedures according to an embodiment of the present disclosure. FIG. 9 illustrates that, in some embodiments, a source gNB receives a measurement report from a UE and sends a handover request including MBS information e.g., MBS service IDs, TMGIs to the target gNB, the source gNB receives a handover acknowledgement containing an indication about whether the TMGIs or service is a supported MBS node or not supported by the target gNB, and according to the received indication, the source gNB may switch the MBS content (e.g., TMGI, service/session ID) from MRB to DRB), release the MRBs if no other UE receiving it. and send an indication acting as a switch delivery stop to the CN to indicate that the MBRs is switched or released.

Figure 10:
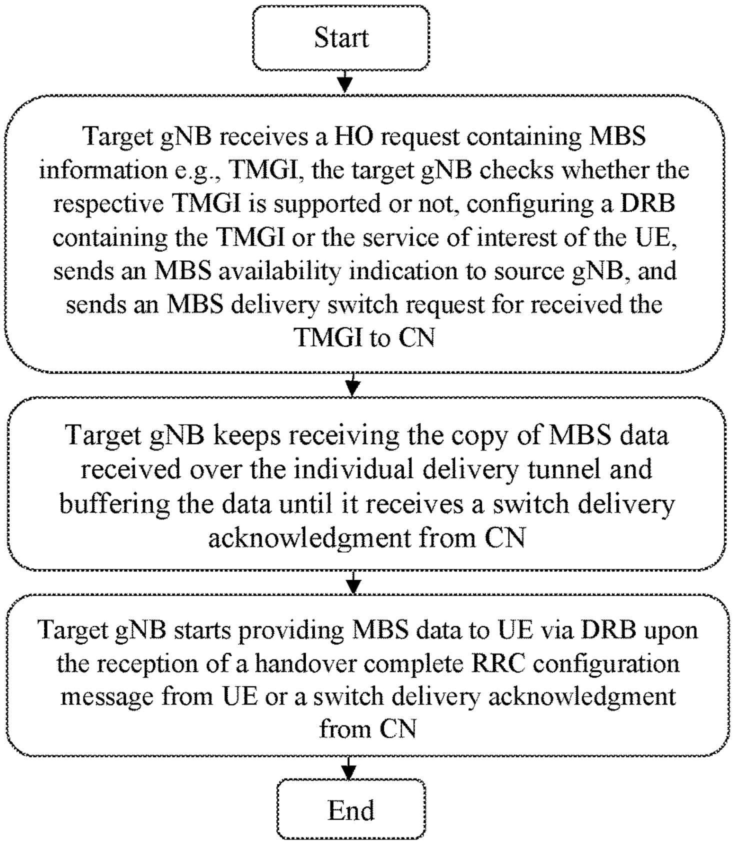
FIG. 10 is a schematic diagram illustrating an example of target gNB side handover procedures according to an embodiment of the present disclosure.

FIG. 10 is a schematic diagram illustrating an example of target gNB side handover procedures according to an embodiment of the present disclosure. FIG. 10 illustrates that, in some embodiments, a target gNB receives a HO request containing MBS information e.g., TMGI, the target gNB checks whether the respective TMGI is supported or not, sends an MBS availability indication to source gNB, and sends an MBS delivery switch request for received the TMGI to CN. Target gNB keeps receiving the copy of MBS data received over the individual delivery tunnel and buffering the data until it receives a switch delivery acknowledgment from CN. Target gNB starts providing MBS data to UE via DRB upon the reception of a handover complete RRC configuration message from UE or a switch delivery acknowledgment from CN.

In summary, some embodiments of this disclosure provide a complete handover method to address the above stated questions/problems and to guarantee UE service continuity during the mobility from a radio access network (RAN) node supporting MBS service to a RAN node not-supporting MBS service while receiving of multicast-broadcast service. In this method, a new handover request message containing [MBS temporary mobile group identity (TMGI) and Service id, MBS MRB Ids and/or MBS QoS flow to MRB mapping] is proposed to be sent from the source RAN node supporting MBS to a target RAN node which do not support MBS to help checking the availability of MBS at the target RAN node, and a new signalling indication message is proposed to be exchanged between the MBS supporting RAN node and the non-supporting RAN node to inform about the status/availability of MBS support at the target gNB. In addition, an early MBS data delivery switch indication is proposed to be provided to be forwarded from target node to CN to switch MBS delivery from Shared MBS traffic delivery method Individual MBS traffic delivery and vice versa. Moreover, in order to guarantee UE service continuity when moving to a target RAN node not supporting MBS, it is proposed to provide a copy of MBS data from CN to both source and the target RAN nodes, to allow UE to continue receiving from the MBS data from both the source RAN node over both MBS radio bearers (MRBs) and unicast data radio bearer (DRB) until the handover process to the target node complete. In this way the service continuity can be guaranteed for the UE since the UE will be able to continue to receive MBS data before, during and after the handover process, this can also help reducing UE service interruption while moving because all configuration and a copy of MBS data is available at the target cell before moving.

Some embodiments of this disclosure provide a new method for a handover for service continuity of multicast-broadcast service (MBS) during the mobility from a radio access network (RAN) node supporting MBS service to a RAN node not supporting MBS service. The major advantages of the new method compared to prior art include: 1. The new method allows UE to continue receiving MBS services during the mobility from a RAN node supporting MBS service to a RAN node not supporting MBS service. 2. The new method allows UE to avoid data loss while receiving MBS services during moving from a RAN node supporting MBS service to a RAN node not supporting MBS service. 3. The new method preconfigures UE with the required configuration for receiving MBS before mobility to target RAN which could minimize UE service interruption during the handover process.

Some embodiments of this disclosure provide a complete handover method to address the above problems and to guarantee UE service continuity during the mobility from a radio access network (RAN) node supporting MBS service to a RAN node not-supporting MBS service while receiving of multicast-broadcast service: The major innovative aspects of the new handover method include at least one of the followings: 1. The new method proposes to include MBS information such as [TMGI and Service id, MBS MRB] within the handover message and to be provided from source RAN supporting MBS to a target RAN not supporting MBS to help checking the MBS availability at the target RAN. 2. The new method proposes a new signalling indication to be exchange between MBS supporting and not supporting gNBs to inform about the MBS availability at the target gNB. 3. The new method proposes an early MBS switch delivery indication to be provided to be forwarded from target node to CN to switch MBS delivery from Shared MBS traffic delivery method Individual MBS traffic delivery and vice versa. 4. The new method proposes to send a copy of MBS data from CN to both source and the target RAN nodes, to assist UE service continuity purpose. 5. The new method allows UE to continue receiving from the MBS data from the source RAN node over both MBS radio bearers (MRBs) and unicast data radio bearer (DRB) until it completes the handover process to the target node; then, continue MBS data reception over the DRB which already configured at the target node which can reduce UE service interruption time.

Figure 11:
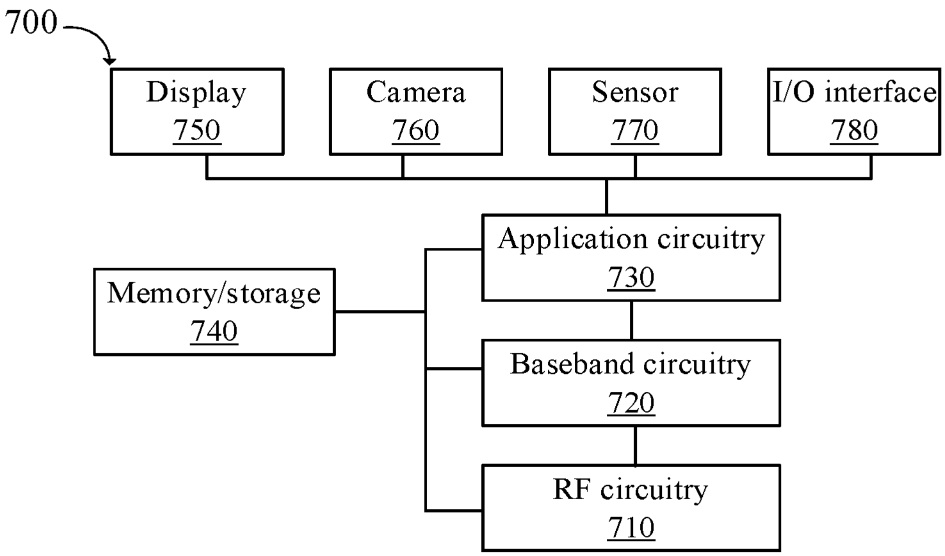
FIG. 11 is a block diagram of a system for wireless communication according to an embodiment of the present disclosure.

FIG. 11 is a block diagram of an example system 700 for wireless communication according to an embodiment of the present disclosure. Embodiments described herein may be implemented into the system using any suitably configured hardware and/or software. FIG. 11 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A handover method for user equipment (UE) multicast-broadcast service (MBS) mobility with service continuity performed by a source base station, comprising:

transmitting, by the source base station, a handover request comprising an MBS information to a target base station, wherein the MBS information comprises at least a quality of service (QOS) flow-to-MBS radio bearer (MRB) mapping and an MBS bearer identity; and receiving, from the target base station, a handover acknowledgement comprising an explicit indication that the MBS information is not supported by the target base station, wherein the explicit indication identifies at least one unsupported QoS flow-to-MRB mapping, MBS bearer identity, temporary mobile group identity (TMGI), or MRB configuration; and switching, by the source base station, an MBS data transmission for the UE from MRBs to one or more unicast data radio bearers (DRBs) configured by the source base station, wherein the one or more DRBs correspond to the at least one unsupported QoS flow-to-MRB mapping;

wherein the switching is performed in direct response to, and only if, the explicit indication indicates that the MBS information is not supported;

wherein the explicit indication is carried in a dedicated information element of the handover acknowledgement; and wherein the switching is completed prior to the UE transmitting a handover complete message to the target base station.

2. The handover method for UE MBS mobility with service continuity of claim 1, wherein the explicit indication comprises a bit field indicating non-support of a temporary mobile group identity (TMGI), a MRB configuration, or the MBS bearer identity.

3. The handover method for UE MBS mobility with service continuity of claim 1, further comprising releasing, by the source base station, the MRBs for the UE in response to the switching.

4. The handover method for UE MBS mobility with service continuity of claim 1, further comprising instructing a core network entity to cease multicast delivery for the MBS session following the switching.

5. The handover method for UE MBS mobility with service continuity of claim 1, wherein switching comprises providing, by the source base station, the MBS data to the UE via the one or more DRBs during the UE's access to the source cell.

6. The handover method for UE MBS mobility with service continuity of claim 1, wherein switching comprises mapping an MBS packet data unit (PDU) session identifier to a DRB tunnel identifier.

7. The handover method for UE MBS mobility with service continuity of claim 1, wherein the explicit indication is included in an XnAP handover request acknowledgment message.

8. The handover method for UE MBS mobility with service continuity of claim 1, wherein the explicit indication indicates non-support of a QoS flow included within the MBS information.

9. The handover method for UE MBS mobility with service continuity of claim 1, wherein the switching enables uninterrupted MBS data reception by the UE until transmission of the handover complete message.

10. The handover method for UE MBS mobility with service continuity of claim 1, wherein the one or more DRBs are configured with QoS parameters corresponding to the QoS flow-to-MRB mapping contained in the MBS information.

11. A handover method for user equipment (UE) multicast-broadcast service (MBS) mobility with service continuity performed by a target base station, comprising:

receiving, form a source base station, a handover request comprising an MBS information, wherein the MBS information comprises a quality-of-service (QOS) flow-to-MBS radio bearer (MRB) mapping and an MBS bearer identity;

determining, by the target base station, that the MBS information is not supported; and transmitting, to the source base station, a handover acknowledgement comprising an explicit indication that the MBS information is not supported, thereby causing the source base station to switch an MBS data transmission for the UE from the MRBs to one or more DRBs in response to the explicit indication and to complete said switching prior to the UE transmitting a handover complete message to the target base station;

wherein the explicit indication identifies at least one unsupported QoS flow-to-MRB mapping, MBS bearer identity, temporary mobile group identity (TMGI), or MRB configuration;

wherein the one or more DRBs correspond to the at least one unsupported QoS flow-to-MRB mapping; and wherein the explicit indication is carried in a dedicated information element of the handover acknowledgement.

12. The handover method for UE MBS mobility with service continuity of claim 11, wherein the determining comprises comparing the MBS information to an MBS capability list of the target base station.

13. The handover method for UE MBS mobility with service continuity of claim 11, wherein the explicit indication identifies a non-supported MRB or temporary mobile group identity (TMGI).

14. The handover method for UE MBS mobility with service continuity of claim 11, wherein the explicit indication is included in an XnAP or NGAP handover acknowledgement information element.

15. The handover method for UE MBS mobility with service continuity of claim 11, further comprising transmitting, by the target base station, a message indicating the MBS non-support to a core network entity.

16. The handover method for UE MBS mobility with service continuity of claim 11, wherein the target base station omits MBS session configuration information from the handover acknowledgement in response to determining non-support.

17. The handover method for UE MBS mobility with service continuity of claim 11, wherein the explicit indication comprises a binary field indicating non-support of the QoS flow-to-MRB mapping.

18. The handover method for UE MBS mobility with service continuity of claim 11, wherein the handover acknowledgement further comprises UE context information excluding MRB-related parameters.

19. The handover method for UE MBS mobility with service continuity of claim 11, further comprising updating, by the target base station, a record of MBS service group membership for the UE based on the non-support determination.

20. The handover method for UE MBS mobility with service continuity of claim 11, wherein the explicit indication triggers the source base station to release UE-specific MRBs prior to UE transmission of the handover complete message.

* * * * *